Sept. 12, 1950 J. J. VIENNEAU 2,522,244
CLAMP FOR THREE-PHASE DELTA YOKE CORES
Filed March 26, 1949

Inventor:
Jacob J. Vienneau,
by Ernest C. Britton
His Attorney.

Patented Sept. 12, 1950

2,522,244

UNITED STATES PATENT OFFICE 2,522,244

CLAMP FOR THREE-PHASE DELTA YOKE CORES

Jacob J. Vienneau, Pittsfield, Mass., assignor to General Electric Company, a corporation of New York Application March 26, 1949, Serial No. 83,722

2 Claims. (Cl. 175—356)

This invention relates to three-phase transformer structures and more particularly to clamping means for the magnetic cores of such structures.

The ordinary delta yoke three-phase transformer core comprises three legs of laminated magnetic material having parallel axes spaced apart angularly by 120 degrees, and connected at each end by yoke portions which are also formed of laminated magnetic material. The laminations comprising the yokes are wound at the ends of the three leg members and in alternate layers with respect to the laminations which comprise the leg members.

It is an object of this invention to provide a new and effective clamping means for a three-phase delta yoke core structure of the type just described.

It is a further object of this invention to provide a clamping means for a three-phase delta yoke core structure which effectively holds the leg and yoke laminations of the core structure tightly together in assembled relation.

It is a further object of this invention to provide an adjustable, self-aligning clamp for a three-phase transformer which permits rigid clamping without distortion of the transformer core.

My invention will be better understood from the following description taken in connection with the accompanying drawing, and its scope will be pointed out in the appended claims.

Figure 1:
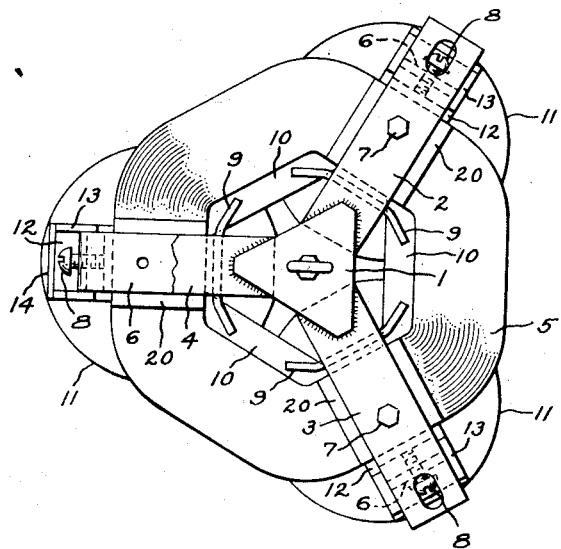
Figure 3:
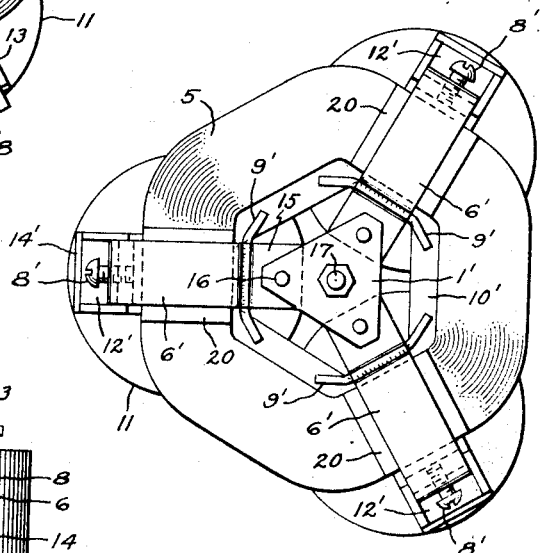
Figure 2:
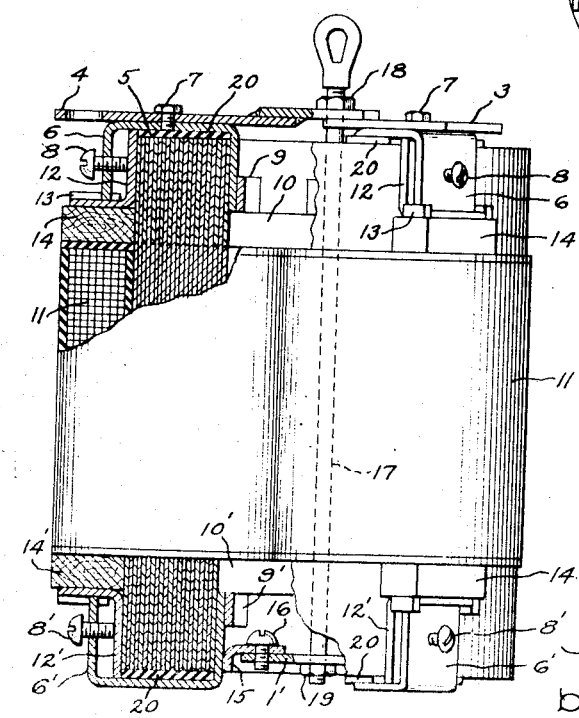

In the drawing, Fig. 1 shows a top view, partly broken away, of a three-phase delta yoke core transformer using the clamping means of my invention; Fig. 2 shows a view in elevation of a three-phase transformer, partly in cross section, using my clamping means and Fig. 3 shows a bottom view of a three-phase transformer using my clamping means.

Referring now to the drawing, Fig. 1 shows my clamping structure as applied to the upper part of a three-phase transformer. As will be seen in the drawing, the clamping structure comprises a triangular-shaped plate 1 having its three corners respectively pointing toward the axes of the three legs of the transformer core. Rigidly attached to the three corners of plate 1, respectively, by a welded joint or other suitable means, are extending arms 2, 3, and 4. These arms 2, 3, 4 are positioned over the transformer core 5 at the points where the laminated leg members join the laminated upper yoke member. The yoke laminations and leg laminations are interleaved at the points where the legs join the upper and lower yokes.

Cooperating with the aforementioned arms 2, 3, and 4 are three members 6 of U-shape, each member 6 being attached to its respective arm, either 2, 3, or 4, by means of a screw 7. The U-shape of members 6 permits them to straddle the cross-section of the transformer laminations. The interior leg of each member 6 is provided near its lower end with a wing-shaped member 9, which is welded or otherwise firmly attached to the member 6. The function of members 9 is to act as bearings for blocks 10 which, in turn, serve as bearings or supports for the coils 11. The blocks 10, which are made of an insulating material such as, for example, wood, are placed around the interior perimeter of the transformer core, and bear upon wing-shaped members 9 at the top of the transformer, and upon similar wing-shaped members 9' at the lower end of the transformer.

The adjustable clamping action on the laminations is obtained by the cooperation between members 6 and right angle-shaped members 12, which move relatively to members 6 when screws 8 are tightened. This clamping action compresses the interleaved leg and yoke laminations and holds them rigidly and tightly bound together. Members 12 are provided with upstanding edges 13 which act as guide members during the relative motion which occurs between members 6 and 12 when screws 8 are tightened. The tightening of screws 8 causes an inward motion of right angle members 12, thereby compressing the laminations. Right angle members 12 are each respectively supported upon a block 14 of a suitable insulating material, such as, for example, wood, which rests upon the top of coil 11.

It will be noted that each of the three coils 11 are respectively supported at three points, supports at two of the points being blocks 10, and the third support being block 14.

As will be seen from the top view in Fig. 1, the core clamping action between members 6 and 12 is provided at three different points around the periphery of the top yoke of the transformer core structure, at the points where the three legs of the transformer join the upper yoke. The clamping arrangement is the same at all three points on the top. As will be described hereinafter, a similar three-point clamping action is provided at the lower part of the transformer.

The clamp structure at the bottom of the transformer is very similar to that at the top but differs in several respects. As in the upper part of the structure, the clamping action is due to the relative motion between U-shaped members 6', which straddle the lamination cross-section, and right angle members 12' which move inwardly relative to members 6' when screws 8' are tightened. As in the clamping arrangement at the top, wing-shaped members 9' are welded or otherwise suitably attached to U-shaped members 6' and serve as bearings for blocks 10'. The principal distinction between the upper and lower clamping arrangement is that each of the lower U-shaped members 6' has a support member 15 rigidly attached by a welded joint or other suitable means to its inside leg, that is, to the leg on the interior side of the transformer core. Each support member 15 is securely attached at its other end to a corner of lower triangular-shaped plate 1' by means of a screw 16.

The upper and lower clamping assemblies are connected together by means of a center rod 17, having threaded ends upon which nuts 18 and 19 are screwed to hold the upper and lower clamping assemblies secured in position with respect to the longitudinal axis of the transformer structure.

Some suitable material, such as pressboard insulation 20, may be used as a cushion to prevent abrasion of the upper and lower surfaces of the laminated core at the points where they engage the clamping structure.

It will be seen from the foregoing description that my invention provides an adjustable, self-aligning clamp for a three-phase transformer which effectively and securely holds the transformer laminations in tightly assembled relation without distorting the transformer core. It provides an effective clamping action on the interleaved leg and yoke laminations of the transformer core, and holds the core legs rigidly and securely aligned with respect to the yokes which join the legs together at each end of the core. By providing this tight clamping action at the joints between the legs and the yokes, the reluctance of the magnetic circuit of the transformer core is reduced, thereby resulting in better electrical characteristics and lower electrical losses.

While there have been shown and described particular embodiments of my invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States, is:

1. In a three-phase transformer having a magnetic core comprising three legs of laminated magnetic material, said three legs having parallel axes, the ends of said three legs at each end of said core being connected by a laminated yoke member which circumscribes said leg members, the laminations of said yoke members being interleaved with respect to said leg laminations, said leg members being displaced from one another by substantially 120 degrees of the periphery of said yoke members, a clamp assembly to hold said yoke members and leg members in rigid relation with respect to one another, said clamp assembly comprising an axially-positioned support plate at each end of said core, an axial rod connecting said support plates together, each of said support plates having three support members rigidly attached thereto and extending radially therefrom, said three radial support members at each end of said core being spaced apart from one another by substantially 120 degrees and lying along the same radial lines as the ends of said three leg members and interleaved yoke member at the respective ends of said core, a separate U-shaped member attached to each of said support members, each of said U-shaped members straddling the end of one of said legs and an interleaved yoke member, a right-angle member movable between one side of each of said U-shaped members and a surface of the respective interleaved leg and yoke member to which said U-shaped member is adjacent, said surface being parallel to the axis of said leg, and means to compress said right-angle member against said interleaved leg and yoke member to clamp said leg and yoke member rigidly together between said right-angle member and the other side of the respective U-shaped member with which said right-angle member is associated.

2. In a three-phase transformer having a magnetic core comprising three legs of laminated magnetic material, said three legs having parallel axes, the ends of said three legs at each end of said core being connected by a laminated yoke member which circumscribes said leg members, the laminations of said yoke members being interleaved with respect to said leg laminations, said leg members being displaced from one another by substantially 120 degrees of the periphery of said yoke members, a clamp assembly to hold said yoke members and leg members in rigid relation with respect to one another, said clamp assembly comprising an axially-positioned support plate at each end of said core, an axial rod connecting said support plates together, each of said support plates having three support members rigidly attached thereto and extending radially therefrom, said three radial support members at each end of said core being spaced apart from one another by substantially 120 degrees and lying along the same radial lines as the ends of said three leg members and interleaved yoke member at the respective ends of said core, a separate U-shaped member attached to each of said support members, each of said U-shaped members straddling the end of one of said legs and an interleaved yoke member, a right-angle member movable between one side of each of said U-shaped members and a surface of the respective interleaved leg and yoke member to which said U-shaped member is adjacent, said surface being parallel to the axis of said leg, and a screw movable in said side of each of said U-shaped members to compress said right-angle member against said interleaved leg and yoke member to clamp said leg and yoke member rigidly together between said right-angle member and the other side of the respective U-shaped member with which said right-angle member is associated.

JACOB J. VIENNEAU.

No references cited.